UNITED STATES PATENT OFFICE.

HENRY BLUMENBERG, OF LOS ANGELES, CALIFORNIA.

PROCESS OF DESTROYING SCALE AND THE LIKE ON CITRUS TREES.

1,337,538. Specification of Letters Patent. Patented Apr. 20, 1920.

No Drawing. Application filed December 26, 1916. Serial No. 138,696.

*To all whom it may concern:*

Be it known that I, HENRY BLUMENBERG, a citizen of the United States, residing at Los Angeles, in the county of Los Angeles and State of California, have invented new and useful Improvements in Processes of Destroying Scale and the like on Citrus Trees, of which the following is a specification.

My invention relates to a process of destroying scale, and the like, on citrus trees.

As well known, the only successful method at the present time for the destruction of scale, insects, and the like, on citrus trees, is by the application of hydrocyanic acid gas (HCN). While this process is successful in destroying the scale, it has many disadvantages. The hydrocyanic acid gas process is expensive, can only be employed at night, as daylight decomposes the gas, and an over dose has a disastrous effect on the trees, causing the leaves to turn yellow and to fall. Again the cyanids from which the hydrocyanic gas is generated decompose immediately upon the opening of the container, especially in the presence of moisture or sunlight, and consequently the cyanid process is injurious and dangerous to the operators.

I have discovered a process which is more efficient, less expensive, and which may be used during the daytime as well as at night, as the re-agent employed is not subject to decomposition at ordinary temperatures. Furthermore, an over dose of the re-agent is not injurious to the trees. Again the materials used for generating the re-agent are natural products of the earth and can therefore be more readily and cheaply obtained.

In carrying out of my process, I use any one of the following gases: phosphin, arsin, or stibin. From one-half to six ounces of phosphid, arsenid or antinonid capable of liberating any one of the gases just mentioned is used to every one hundred cubic feet in the fumigation of the citrus trees which, as well known, is usually carried out by covering the tree with a canvas inclosure. The quantity of the re-agent employed will depend upon the degree of infection of the citrus trees with scale, and the like. The duration of the fumigation is from twenty minutes to two hours, depending on the physical conditions, the scale, and the quantity of gas employed.

In place of one of the gases mentioned, a mixture of two or all of them may be used. The richest gas is generated from the alloys of phosphorus, antimony, and arsenic, by the treatment of re-agents capable of liberating nascent hydrogen in either acid or alkaline solutions. For example:

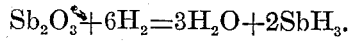
$$Sb_2O_3 + 6H_2 = 3H_2O + 2SbH_3.$$

Most excellent results have been obtained by the use of mispickel (arsenid of iron) and dissolving it in an acid solution. Pyrites, containing arsenic, may be used, but care must be exercised that no excess of sulfurous acid gas ($SO_2$) and similar gases are liberated, especially if the process is used in daytime, as the sunlight may have an oxidizing effect on this gas, converting it into minute quantities of $SO_3$ which is detrimental to plant life.

In the use of the process the same care must be taken with my re-agents as with the hydrocyanic acid gas. They are extremely poisonous. Furthermore, they are liable to become explosive. This is especially true of phosphin under certain conditions.

Phosphin having extremely weak basic properties and arsin and stibin having no basic properties, my re-agents will have no injurious effect on plant life as is the case with hydrocyanic acid gas.

The lowest temperature at which phosphin is decomposed is 150° F. and is 400° F. for arsin, with stibin between the two. These gases may be used either during the day or at night which gives them a decided practical and economical advantage over hydrocyanic acid gas. The latter, under the influence of sunlight and moisture, splits up into ammonia, formic acid, etc., which re-acts on the trees, turning the leaves yellow and causing them to fall.

The re-agents are useful in destroying all kinds of scale and insects infesting citrus trees, such as citricola scale—*Coccus Citricola*, black scale—*Lecanium Oleae*, cottony cushion scale—*Icerya Purchasi*, red scale—*Aspidiotus Aurantii*, yellow scale—*Chrysomphalus Aurantii*, San José scale—*Aspidiotus Perniciosus*, purple scale—*Lepidosaphes Beckii*, and mealy bug scale—*Pseudococcus Citri*.

I claim:

1. A process of destroying scale and the like on citrus trees, comprising treating the scale-infested trees with a compound consisting of hydrogen and an element of the phosphorus group with the exception of nitrogen and boron.

2. A process of destroying scale and the like on citrus trees, comprising forming a closure about a scale-infested tree and treating said tree with a compound consisting of hydrogen and an element of the phosphorus group with the exception of nitrogen and boron.

3. A process of destroying scale and the like on citrus trees, comprising treating the scale infested trees with arsin.

In testimony whereof I have signed my name to this specification.

HENRY BLUMENBERG.